(12) United States Patent
Kuhn et al.

(10) Patent No.: US 11,239,731 B2
(45) Date of Patent: Feb. 1, 2022

(54) ELECTRIC MOTOR ASSEMBLY

(71) Applicant: Bayerische Motoren Werke Aktiengesellschaft, Munich (DE)

(72) Inventors: Marcel Kuhn, Kist (DE); Roman Nestlinger, Munich (DE); Ignacio Serrahima, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 166 days.

(21) Appl. No.: 16/705,061

(22) Filed: Dec. 5, 2019

(65) Prior Publication Data

US 2020/0119623 A1 Apr. 16, 2020

Related U.S. Application Data

(63) Continuation of application No. PCT/EP2018/064826, filed on Jun. 6, 2018.

(30) Foreign Application Priority Data

Jun. 26, 2017 (DE) .................. 10 2017 210 675.1

(51) Int. Cl.
    *H02K 11/215* (2016.01)
    *H02K 11/22* (2016.01)
    *H02K 11/01* (2016.01)

(52) U.S. Cl.
    CPC ....... *H02K 11/215* (2016.01); *H02K 11/0141* (2020.08)

(58) Field of Classification Search
    CPC .................. H02K 11/215; H02K 11/0141
    USPC .................................... 310/68 B, 68 D
    See application file for complete search history.

(56) References Cited

U.S. PATENT DOCUMENTS

| 4,924,674 A | 5/1990 | Hara et al. |
| 6,838,793 B2 | 1/2005 | Zens |
| 9,379,598 B2 * | 6/2016 | Someya .................. G01B 7/30 |

(Continued)

FOREIGN PATENT DOCUMENTS

| CN | 103825398 A | 5/2014 |
| DE | 89 04 395 U1 | 5/1989 |
| DE | 41 17 801 A1 | 12/1991 |

(Continued)

OTHER PUBLICATIONS

PCT/EP2018/064826, International Search Report dated Sep. 4, 2018 (Two (2) pages).

(Continued)

*Primary Examiner* — John K Kim
(74) *Attorney, Agent, or Firm* — Crowell & Moring LLP

(57) ABSTRACT

An electric motor assembly (10), in particular for driving a vehicle, comprises an electric motor (12), a magnetic sensor (46) and a shield (14), the electric motor (12) being equipped with a stator (16), a rotor (18) and at least one magnet (28) which is connected to the rotor (18) for conjoint rotation therewith and generates a measuring magnetic field ($M_M$). The magnetic sensor (46) is located in the measuring magnetic field ($M_M$) and is connected to the shield (14), and the shield (14) has high magnetic permeability and is closed in the area of the magnetic sensor (46).

15 Claims, 3 Drawing Sheets

(56) References Cited

U.S. PATENT DOCUMENTS

| | | | |
|---|---|---|---|
| 10,404,142 B2* | 9/2019 | Ohnishi | H02K 7/003 |
| 2020/0119623 A1* | 4/2020 | Kuhn | H02K 11/215 |

FOREIGN PATENT DOCUMENTS

| | | |
|---|---|---|
| DE | 38 73 242 T2 | 12/1992 |
| DE | 200 11 138 U1 | 10/2001 |
| DE | 10 2004 059 181 A1 | 6/2006 |
| DE | 10 2010 040 857 A1 | 3/2012 |
| JP | 2008-160909 A | 7/2008 |

OTHER PUBLICATIONS

German Search Report issued in German counterpart application No. 10 2017 210 675.1 dated May 25, 2018, with Statement of Relevancy (Seven (7) pages).

* cited by examiner

ELECTRIC MOTOR ASSEMBLY

CROSS REFERENCE TO RELATED APPLICATIONS

This application is a continuation of PCT International Application No. PCT/EP2018/064826, filed Jun. 6, 2018, which claims priority under 35 U.S.C. § 119 from German Patent Application No. 10 2017 210 675.1, filed Jun. 26, 2017, the entire disclosures of which are herein expressly incorporated by reference.

BACKGROUND AND SUMMARY OF THE INVENTION

The invention relates to an electric motor assembly, especially for driving a vehicle, having an electric motor and a magnetic field sensor.

In electric motors for driving a vehicle it is usually necessary for the rotor position of the rotor of the electric motor and the rotary speed of the electric motor to be known.

In order to determine the rotor position of the rotor, a combination of a magnet and a magnetic field sensor is usually employed, wherein the magnet is connected to the rotor and generates a measuring magnetic field, in which the magnetic field sensor is situated. The magnetic field sensor is stationary and the magnet is connected in a rotationally fixed manner to the rotor, so that the magnet rotates relative to the magnetic field sensor along with its measuring magnetic field.

Now, owing to the magnetic field sensor, the angle of the measuring magnetic field can be determined, so that the position of the rotor may be inferred. Especially in electric motors for driving a vehicle, there are high demands on the accuracy of this rotor position detection.

It is a problem that a perturbing magnetic field is produced by the rotor magnetic coil during the operation of the electric motor, which may affect the measuring magnetic field. To avoid this problem it is known how to arrange the magnet and the magnetic field sensor inside the metallic shaft of the electric motor in order to lessen these perturbing influences.

However, this does not entirely eliminate the perturbing influences of the magnetic field of the rotor.

Thus, one problem which the invention proposes to solve is to provide an electric motor assembly in which the measuring magnetic field is not perturbed by the magnetic field of the rotor.

The problem is solved by an electric motor assembly, especially for driving a vehicle, having an electric motor, a magnetic field sensor and a shield, wherein the electric motor comprises a stator, a rotor, and at least one magnet, which is connected to the rotor in a rotationally fixed manner and which generates a measuring magnetic field. The magnetic field sensor is situated in the measuring magnetic field and connected to the shield, wherein the shield has high magnetic permeability and is closed in the area of the magnetic field sensor. For example, the magnetic field sensor is fastened to a part of the shield.

High magnetic permeability means that the corresponding material has a coefficient of permeability $\mu_r$ greater than 10, especially $\mu_r$ greater than 100.

The magnet may be a permanent magnet, for example a ring magnet, a tubular magnet, or two oppositely situated magnetic plates or magnetic rods. The magnetic field sensor is fixed, in particular, and does not rotate with the rotor. In particular, the magnetic field sensor is carried by the shield.

The measuring magnetic field denotes that portion of the magnetic field of the magnet which lies within the ring or tubular magnet or between the magnetic plates, and which is homogeneous in particular.

The magnetic field sensor may be an MR sensor, based on the magnetoresistive effect.

Owing to providing a shield with high magnetic permeability, the magnetic field of the rotor magnetic coil and the magnetic field line run through the shield and may thus be kept away from the measuring magnetic field. In this way, a particularly perturbation-free measurement of the angle of rotation and the rotor position is possible.

Preferably, the magnet is mounted on the shaft of the electric motor. This shaft is made of metal, especially steel, and thus has high magnetic permeability. In this way, a measurement with high precision near the axis of rotation is possible.

In order to protect the magnetic field sensor in part against perturbing magnetic fields, the shaft may have a cavity at one of its ends, being open in the axial direction at this end of the shaft, wherein the magnet is fastened in the cavity to an inner side of the shaft. The magnetic field sensor is provided at the radial inner side of the magnet. The magnetic field sensor may be mounted in the area of the magnet in the axial direction, so that the magnet rotates about the magnetic field sensor. The terms "axial" and "radial" are to be understood in relation to the axis of rotation.

For example, the shield has a base part and a sensor holder, the base part being closed in the area of the axis of rotation. The base part is for example a metal plate and thus it likewise has high magnetic permeability. For example, the base part is a housing or a bearing shield of the electric motor assembly. The magnetic field lines of the rotor of the electric motor are led through the base part, so that the magnetic field of the rotor does not perturb the measurement of the magnetic field sensor.

By way of example, the shield has a base part and a sensor holder, an opening being provided in the base part in the area of the axis of rotation, which opening is closed by the sensor holder. The base part is for example a metal plate and thus it likewise has high magnetic permeability. For example, the base part is a housing or a bearing shield of the electric motor assembly. The opening allows easy access to the shaft.

In one embodiment of the invention, the sensor holder has a base body and/or a shield element, the shield element being made from a material with high magnetic permeability. The base body may be made of plastic, especially by overmolding the shield element. The magnetic permeability of the plastic is around $\mu_r=1$. In this way, the sensor holder can be produced in a cost-effective manner.

In order to improve the centering of the magnetic field sensor and achieve an accurate fit with respect to the base part, the shield element is made of metal. Thus, the shield element is not made of plastic, since a shield element made of plastic would have larger manufacturing tolerances.

For example, the shield element is U-shaped in cross section, the legs of the U extending into the opening. The shield element for example has the shape of a flat dish, such as a Petri dish. In this way, the shield can be easily and effectively closed in the area of the magnetic field sensor.

Preferably, the electric motor assembly comprises a carrier, which is fastened to the shield, especially to the sensor holder, and extends into the cavity of the shaft, the magnetic field sensor being fastened to the carrier, so that the magnetic field sensor can be easily introduced into the cavity of the shaft.

For a cost-effective production, the carrier can be designed as a single piece with the sensor holder, especially with the base body.

For example, the sensor holder has at least a first thickness and a second thickness in the axial direction, wherein the sensor holder has the first thickness in a radially inward area, especially in the area bordering on the carrier, the sensor holder having the second thickness radially outside the area of the first thickness, especially radially outside the area of the opening, and wherein the first thickness is less than the second thickness. In this way it is possible to both economize on material and also provide design space for other components. The area of the first thickness can furthermore lie at least partly in the area of the opening.

The shaft may protrude beyond the rotor in the axial direction toward the shield, in particular it may extend into the opening. It may extend between the legs of the shield element. In this way, the magnetic field sensor is especially well shielded.

The shaft may, for example, extend as far as into the opening in the area of the sensor holder having the first lesser thickness. In this way, the entire shield may be placed closer to the electric motor, as a result of which the axial design space of the electric motor assembly is reduced.

Preferably, the shield forms at least a portion of a housing of the electric motor or of a bearing shield, as a result of which multiple functions are fulfilled by the shield.

In one variant embodiment, at least one current conductor is provided in the rotor, the current conductor being situated with respect to the magnet such that a perturbing magnetic field induced by a current through the current conductor in the area of the measuring magnetic field is substantially parallel to the measuring magnetic field. By a parallel magnetic field is meant that the magnetic field lines run parallel to each other, these possibly also running in opposite directions. This ensures that the measuring magnetic field is influenced by the perturbing magnetic field as little as possible. For example, the electric motor is a synchronous machine.

Further features and advantages of the invention will emerge from the following description as well as the enclosed drawings, to which reference shall be made. The drawings show:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
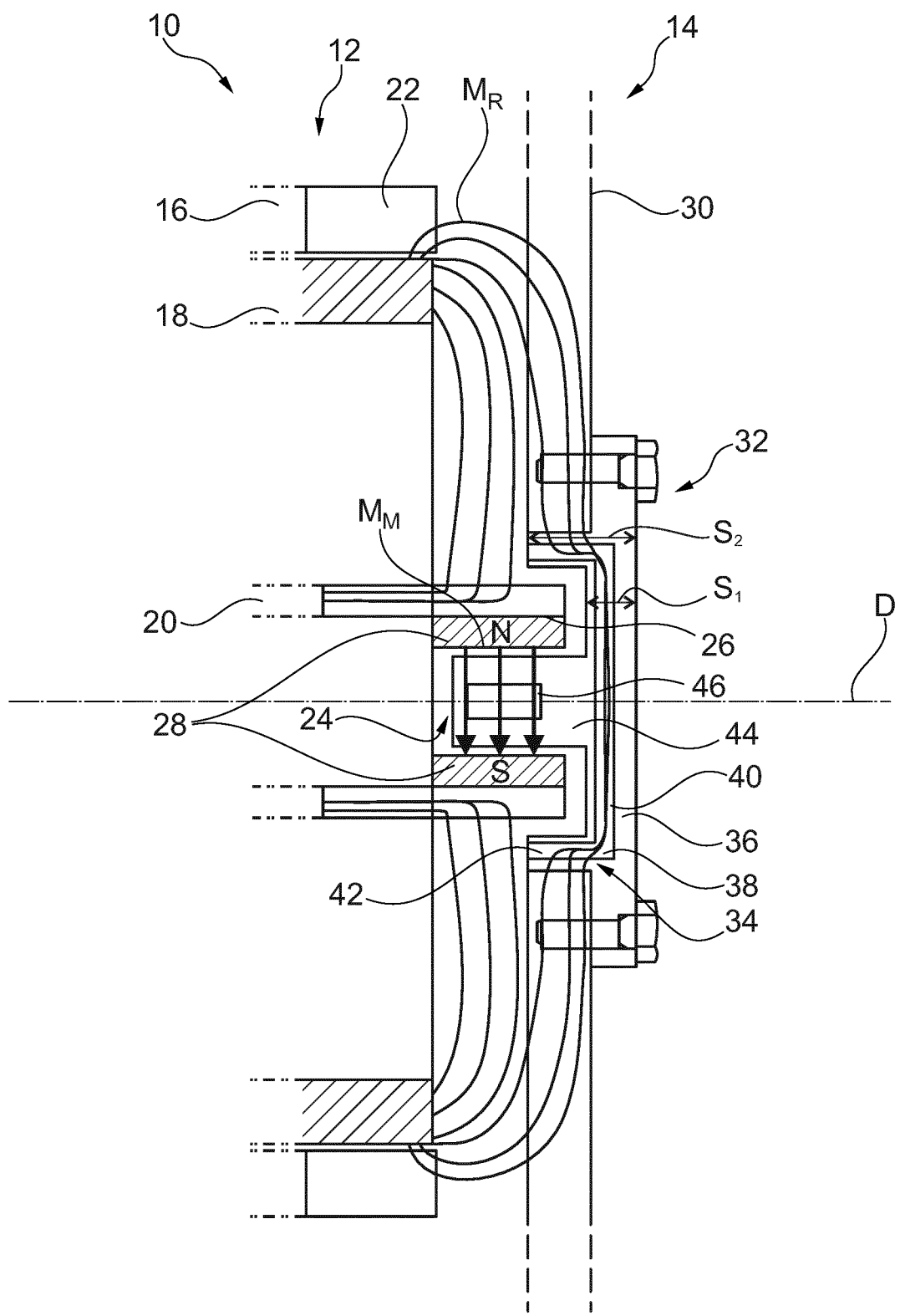
FIG. 1, parts of an electric motor assembly according to the invention per a first embodiment of the invention, schematically shown in cross section.

FIG. 1 schematically shows an electric motor assembly 10 with an electric motor 12 and a shield 14.

The electric motor 12 comprises a stator 16, an interior rotor 18, and a shaft 20, and it is for example a synchronous machine.

For example, the electric motor 12 is an electric motor for driving a vehicle for hybrid vehicles or purely electrically driven vehicles, especially cars.

In the embodiment shown, the electric motor 12 is an interior rotor motor, but of course the electric motor 12 may also be an exterior rotor motor.

The rotor 18 comprises a rotor magnetic coil 22, which generates a rotor magnetic field during the operation of the electric motor 12, whose magnetic field lines $M_R$ are drawn in FIG. 1.

The shaft 20 is connected in a rotationally fixed manner to the rotor 18 and thus defines the axis of rotation D of the rotor 18. The shaft 20 is made of metal, especially steel, and thus it has high magnetic permeability.

The terms "axial" and "radial" pertain in the following to the axis of rotation D of the shaft 20.

The shaft 20 extends in its axial direction further than the rotor 18 and thus it protrudes beyond the rotor 18 toward the shield 14.

The portion of the shaft 20 sticking out beyond the stator 16 is designed as a hollow shaft, being open toward the shield 14. The cavity 24 formed in this way is bounded by an inner side 26 of the shaft 20.

In the cavity 24 there is provided a magnet 28, which is fastened to the inner side 26 of the shaft 20. The magnet 28 is thus connected in a rotationally fixed manner to the shaft 20 and the rotor 18.

In the embodiment shown, the magnet 28 has two magnetic plates. The magnetic plates of the magnet 28 lie facing each other and are respectively secured to the inner side 26 of the shaft 20.

The magnetic plates are permanent magnets, for example. However, the magnet 28 may also be designed as an electromagnet.

It is also conceivable for the magnet 28 to be a tubular magnet or a ring magnet, or to consist of two oppositely situated rod magnets.

The magnet 28 generates a magnetic field, which is substantially homogeneous between the two magnetic plates of the magnet 28. This portion of the magnetic field which is homogeneous is called the measuring magnetic field $M_M$ and is indicated by arrows in FIG. 1.

The orientation of the measuring magnetic field $M_M$ thus rotates together with the rotor 18.

The shield 14, on the other hand, is stationary, i.e., not rotatable, so that the rotor 18 turns relative to the shield 14.

The shield 14 comprises a base part 30 and a sensor holder 32, which is fastened to the base part 30. The base part 30, for example, is a metal plate and thus it likewise has high magnetic permeability.

The base part 30 covers the electric motor 12 on one side and has an opening 34 in the area of the shaft 20, which is aligned for example with the axis of rotation D of the shaft 20.

The sensor holder 32 closes the opening 34 and in turn comprises a base body 36 and a shield element 38. The diameter of the shield element 38 therefore virtually corresponds to the diameter of the opening 34.

For example, the sensor holder 32, or rather the base body 36, has a thin area with a first thickness $S_1$ in the axial direction and a thick area with a second thickness $S_2$ in the axial direction. The second thickness $S_2$ here is greater than the first thickness $S_1$.

The shield element 38 is not made of plastic, but rather of a material with high magnetic permeability, such as a metal.

The shield element 38 in the exemplary embodiment shown has the shape of a flat dish, such as a Petri dish, with a bottom 40 and a rim 42, which extends from the bottom 40 out to the electric motor 12.

The shield element 38 is thus U-shaped in cross section, the rim 42 forming legs of the U.

The rim 42 is arranged in the opening 34 and spaced apart from the border of the opening 34 by a thin section of the base body 36.

The shield element 38 thus closes the opening 34 for the magnetic field lines $M_R$ of the rotor 18, so that the shield 14 is closed in the area of the shaft 20.

The shaft 20 extends into the opening 34 and is thus surrounded by the rim 42 of the shield element 38. The shaft 20 is flush in the axial direction with the thin area of the sensor holder 32 or the base body 36.

The shield element 38 is held against the shield 14 by the base body 36.

The base body 36 is made for example from a plastic with a magnetic permeability of around $\mu_r=1$ and is produced by overmolding of the shield element 38.

For its fastening, the base body 36 in the exemplary embodiment shown is screwed together with the base part 30. However, other fastening options are also conceivable.

On the base body 36 in the exemplary embodiment shown there is formed a carrier 44 as a single piece with it, configured as a pin or plate protruding from the base body 36. The carrier 44 extends into the cavity 24 of the shaft 20.

The thin area of the sensor holder 32 or the base body 36 is situated radially outside the area on which the carrier 44 is formed on the base body 36 and borders on it.

The thick area of the sensor holder 32 or the base body 36 borders on the thin area radially outside it and may also be situated radially outside the opening.

At the end of the carrier 44 facing away from the base body 36 there is provided a magnetic field sensor 46, being for example an MR sensor.

The magnetic field sensor 46 is arranged in the measuring magnetic field $M_M$ and thus lies axially in the area of the magnet 28, or more precisely, between the two magnetic plates.

The magnetic field sensor 46 is thus rigidly joined to the shield 14, so that the rotor 18 and thus also the magnet 28 can rotate about the magnetic field sensor 46.

During the operation of the electric motor 12, the rotor 18 is energized with a current, so that the rotor magnetic coil 22 produces a strong magnetic field.

The magnetic field or the field lines $M_R$ of this magnetic field also run in part through the gap between the shield 14 and the rotor 18, radially inward toward the axis of rotation D. Here, portions of the field lines $M_R$ encounter the shaft 20, which on account of its high permeability directs the field lines $M_R$ once more axially in the direction toward the rotor.

Other portions of the field lines $M_R$ run through the gap in the shield 14 and are then taken to opposite portions of the rotor magnetic coil 22 by virtue of the high permeability of the shield 14.

The field lines $M_R$ in the area of the shaft 20 and the magnetic field sensor 46 are focused by the shield element 38 until they have reached the other side of the opening 34 and finally again bridge the gap between shield 14 and rotor 18 in the area of the rotor magnetic coil 22.

Due to the high permeability of the shield element 38, no magnetic field lines $M_R$ of the rotor magnetic coil 22 run free outside of the shield element 38 in the especially sensitive area of the magnetic field sensor 46 and into the measuring magnetic field $M_M$. Therefore, in this way the measuring magnetic field $M_M$ is effectively shielded from the magnetic field of the rotor magnetic coil 22.

Figure 2:
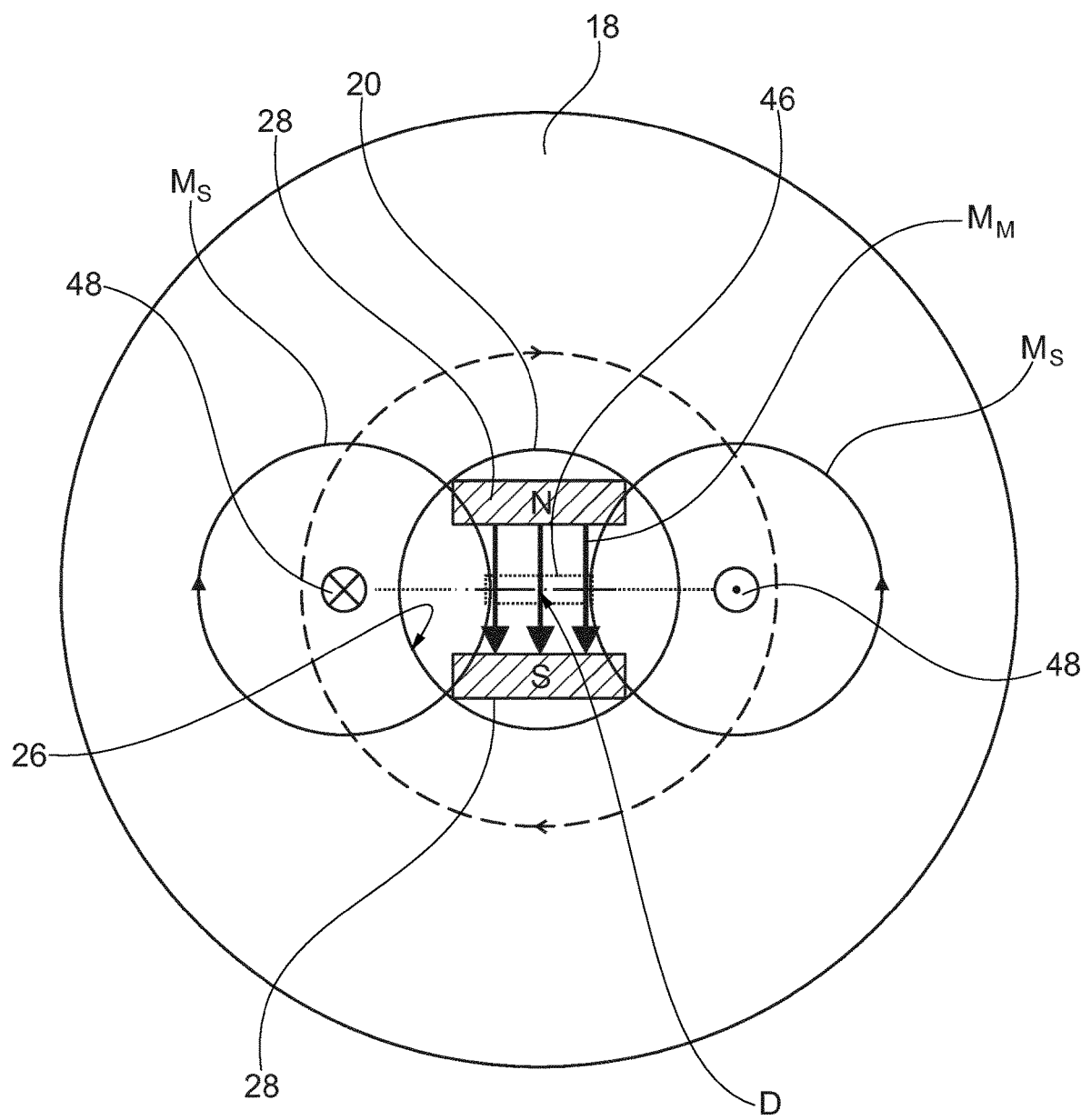
FIG. 2, a rear view of the electric motor of the electric motor assembly of FIG. 1, schematically shown.

FIG. 2 shows a view of the electric motor assembly 10 in the axial direction looking at the rotor 18. For reasons of clarity, the shield 14 is not shown, and only the magnetic field sensor 46 is indicated by a dotted line. The direction of rotation of the rotor 18 is indicated by the dashed line.

It can be seen in FIG. 2 that the rotor comprises multiple current conductors 48, running in the axial direction. For reasons of clarity, the current conductors 48 are not shown in FIG. 1.

The two current conductors 48 are arranged such that an imaginary line (likewise dotted in FIG. 2) runs perpendicular to the axis of rotation joining the two current conductors 48 and parallel to the magnetic field plates of the magnet 28. This imaginary line thus runs perpendicular to the measuring magnetic field $M_M$.

Now, if the rotor 18 is energized, an electric current will flow through the current conductors 48, inducing a perturbing magnetic field $M_S$. This perturbing magnetic field $M_S$ also runs through the measuring magnetic field $M_M$ and may perturb it.

Due to the position of the current conductors 48 relative to the measuring magnetic field $M_M$, the magnetic field lines of the perturbing magnetic field $M_S$ in the area of the measuring magnetic field $M_M$ run substantially parallel to the measuring magnetic field $M_M$.

In the example shown in FIG. 2, they run in the same direction as the magnetic field lines of the measuring magnetic field $M_M$, however it is also conceivable for the magnetic field lines of the perturbing magnetic field $M_S$ to run opposite the magnetic field lines of the measuring magnetic field $M_M$ upon reversed energization of the current conductors 48.

In this way, while the perturbing magnetic field $M_S$ changes the magnitude of the measuring magnetic field $M_M$, it does not change the direction, so that only a very slight perturbation of the measurement of the magnetic field sensor 46 results from the current conductors 48.

Figure 3:
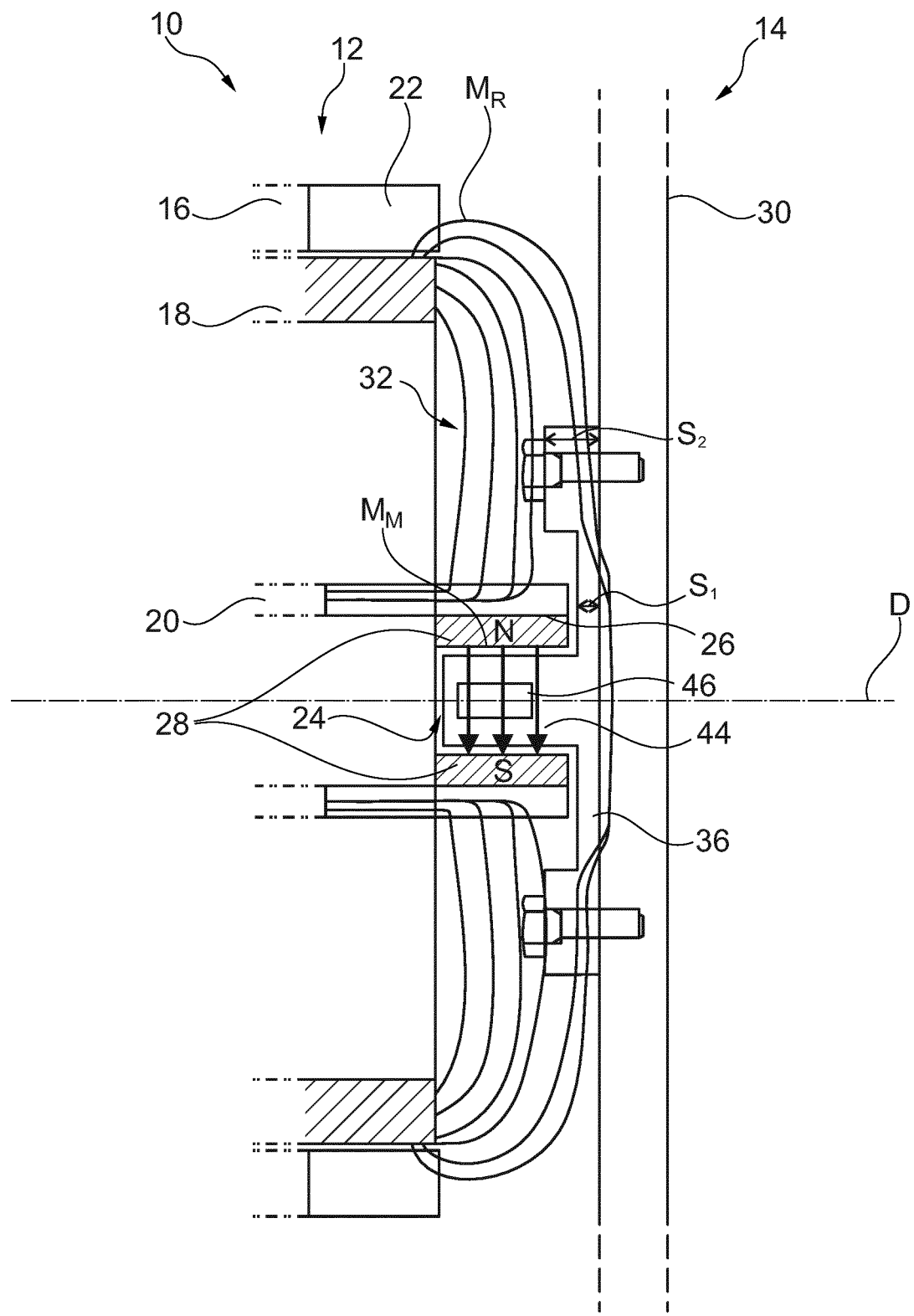
FIG. 3, parts of an electric motor assembly according to the invention per a second embodiment of the invention, schematically shown in cross section.

FIG. 3 shows a second embodiment of the invention corresponding substantially to the first embodiment. Therefore, in the following only the differences will be discussed, and the same or functionally equivalent parts are given the same reference numbers.

In the second embodiment, no opening is provided in the base part 30, but rather the base part 30 is also closed in the area of the axis of rotation D.

The sensor holder 32 is fastened on the side of the base part 30 facing toward the electric motor 12.

In the second embodiment, the sensor holder 32 has no shield element 38, but rather only comprises the base body 36 and the carrier 44.

The base body 36, as in the first embodiment, has a thin area with a first thickness $S_1$ in the axial direction and a thick area with a second thickness $S_2$ in the axial direction. The second thickness $S_2$ here is greater than the first thickness $S_1$.

The area of the first thickness $S_1$ is the radially outermost area of the base body 36. In this area, the sensor holder 32 is fastened to the base part 30, for example by screws.

On the radial inside, the area of the first thickness $S_1$ is adjoined by the area of the second thickness $S_2$. The base body 36, for example, lies against the base part 30 in the area of the second thickness $S_2$.

On the radial inside of the area of the second thickness $S_2$ and comprising the center axis of the sensor holder 32, the carrier 44 is provided.

Thus, on the whole, a T shape of the sensor holder 32 results in cross section.

The base body 36 and the carrier 44 are made in particular as a single piece, for example from a plastic.

As compared to the shaft 20, the area of the first thickness $S_1$ lies radially outside the shaft or an imaginary prolongation of the shaft 20. The carrier 44 lies radially inside the shaft 20, and the area of the second thickness $S_2$ connects the area of the first thickness $S_1$ to the carrier 44, i.e., the area of the second thickness $S_2$ extends through the imaginary prolongation of the shaft 20.

Because of the slight thickness $S_2$ and the fact that the base part 30 is closed in the area of the axis of rotation D, the field lines $M_R$ as described for the first embodiment are guided either by the shaft 20 or by the base part 30 and therefore do not run into the measuring magnetic field $M_M$.

The advantage of this second embodiment is that the sensor holder 32 can be more easily designed.

In both embodiments, the sensor holder 32 may have at least one cable output and/or plug.

Of course, the features of the two embodiments can be combined with each other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric motor assembly configured to drive a vehicle, the assembly comprising:
   an electric motor comprising a stator, a rotor, and at least one magnet that is connected to the rotor in a rotationally fixed manner and which generates a measuring magnetic field;
   a magnetic field sensor; and
   a shield,
   wherein the magnetic field sensor is situated in the measuring magnetic field and connected to the shield,
   wherein the shield has high magnetic permeability and is closed in the area of the magnetic field sensor,
   wherein the magnet is mounted on a shaft of the electric motor,
   wherein the shaft has a cavity at an end of the shaft, wherein the end of the shaft is open in an axial direction,
   wherein the magnet is fastened in the cavity to an inner side of the shaft,
   wherein the magnetic field sensor is provided in the cavity at a radial inner side of the magnet, and
   wherein the shield has a base part and a sensor holder, wherein the base part is closed in an area of an axis of rotation.

2. The electric motor assembly according to claim 1, wherein the sensor holder has one or both of a base body and a shield element where the shield element is made from a material with high magnetic permeability.

3. The electric motor assembly according to claim 2, wherein the shield element is made of metal.

4. The electric motor assembly according to claim 1, wherein the electric motor assembly further comprises a carrier that is fastened to the shield and which extends into the cavity of the shaft, wherein the magnetic field sensor is fastened to the carrier.

5. The electric motor assembly according to claim 4, wherein the carrier is configured as a single piece with the sensor holder.

6. The electric motor assembly according to claim 1, wherein the sensor holder has at least a first thickness and a second thickness in the axial direction,
   wherein the sensor holder has the first thickness in a radially inward area, and has the second thickness radially outside the radially inward area of the first thickness, and
   wherein the first thickness is less than the second thickness.

7. The electric motor assembly according to claim 1, wherein the shaft protrudes beyond the rotor in the axial direction toward the shield and extends into the opening.

8. The electric motor assembly according to claim 1, wherein the shield forms at least a portion of a housing of the electric motor or of a bearing shield.

9. An electric motor assembly configured to drive a vehicle, the assembly comprising:
   an electric motor comprising a stator, a rotor, and at least one magnet that is connected to the rotor in a rotationally fixed manner and which generates a measuring magnetic field;
   a magnetic field sensor; and
   a shield,
   wherein the magnetic field sensor is situated in the measuring magnetic field and connected to the shield,
   wherein the shield has high magnetic permeability and is closed in the area of the magnetic field sensor,
   wherein the magnet is mounted on a shaft of the electric motor,
   wherein the shaft has a cavity at an end of the shaft, wherein the end of the shaft is open in an axial direction,
   wherein the magnet is fastened in the cavity to an inner side of the shaft,
   wherein the magnetic field sensor is provided in the cavity at a radial inner side of the magnet, and
   wherein the shield has a base part and a sensor holder, wherein an opening is provided in the base part in an area of an axis of rotation, and
   wherein the opening is closed by the sensor holder.

10. The electric motor assembly according to claim 9, wherein the sensor holder has one or both of a base body and a shield element where the shield element is made from a material with high magnetic permeability.

11. The electric motor assembly according to claim 10, wherein the shield element is made of metal.

12. The electric motor assembly according to claim 10, wherein the shield element has a U-shape in cross section, wherein the legs of the U-shape extend into the opening.

13. The electric motor assembly according to claim 9, wherein the electric motor assembly further comprises a carrier that is fastened to the shield and which extends into the cavity of the shaft, wherein the magnetic field sensor is fastened to the carrier.

14. The electric motor assembly according to claim 13, wherein the carrier is configured as a single piece with the sensor holder.

15. An electric motor assembly configured to drive a vehicle, the assembly comprising:
   an electric motor comprising a stator, a rotor, and at least one magnet that is connected to the rotor in a rotationally fixed manner and which generates a measuring magnetic field;
   a magnetic field sensor; and a shield, wherein the magnetic field sensor is situated in the measuring magnetic field and connected to the shield, wherein the shield has high magnetic permeability and is closed in the area of the magnetic field sensor, and wherein at least one current conductor is provided in the rotor, the current conductor being situated with respect to the magnet such that a perturbing magnetic field induced by a current through the current conductor in the area of the measuring magnetic field is substantially parallel to the measuring magnetic field.

* * * * *